United States Patent
Fischer et al.

(10) Patent No.: US 11,407,076 B2
(45) Date of Patent: Aug. 9, 2022

(54) REGENERATION DEVICE FOR REGENERATING A COOLANT DISPERSION

(71) Applicant: Step-Tec AG, Luterbach (CH)

(72) Inventors: Ludger Fischer, Zug (CH); Silvan von Arx, Neuendorf (CH); Edwin Reinhard, Niederoenz (CH); Lukas Weiss, Pfaeffikon (CH)

(73) Assignee: GF MACHINING SOLUTIONS AG, Biel (CH)

( * ) Notice: Subject to any disclaimer, the term of this patent is extended or adjusted under 35 U.S.C. 154(b) by 107 days.

(21) Appl. No.: 16/509,507

(22) Filed: Jul. 12, 2019

(65) Prior Publication Data

US 2020/0030930 A1    Jan. 30, 2020

(30) Foreign Application Priority Data

Jul. 25, 2018  (EP) .................................... 18185417

(51) Int. Cl.
| B23Q 11/14 | (2006.01) |
| B23Q 11/12 | (2006.01) |
| F28D 20/02 | (2006.01) |
| C09K 5/06 | (2006.01) |

(52) U.S. Cl.
CPC .......... *B23Q 11/141* (2013.01); *B23Q 11/127* (2013.01); *C09K 5/063* (2013.01); *C09K 5/066* (2013.01); *F28D 20/02* (2013.01); *F28D 20/025* (2013.01); *F25C 2300/00* (2013.01)

(58) Field of Classification Search
CPC ....... F28D 2020/082; F28D 2020/0078; F28D 2020/0082
See application file for complete search history.

(56) References Cited

U.S. PATENT DOCUMENTS

| 5,141,079 A | * | 8/1992 | Whitney | .............. C10M 171/00 165/104.17 |
| 6,305,834 B1 | | 10/2001 | Schubert et al. | |
| 6,446,449 B2 | * | 9/2002 | Krauter | ................ B23Q 11/141 62/201 |
| 7,541,009 B2 | * | 6/2009 | Takao | ..................... F25D 17/02 422/198 |
| 7,568,275 B2 | * | 8/2009 | Jensen | ................. B23Q 11/141 269/21 |
| 2005/0057102 A1 | * | 3/2005 | Totsu | .................. G03F 7/70858 310/12.06 |

(Continued)

FOREIGN PATENT DOCUMENTS

| DE | 3042528 A1 | 6/1982 |
| DE | 19525661 A1 | 1/1997 |
| DE | 10120116 A1 | 10/2002 |

(Continued)

*Primary Examiner* — Jenna M Hopkins
(74) *Attorney, Agent, or Firm* — Leydig, Voit & Mayer, Ltd.

(57) ABSTRACT

A regeneration device for regenerating a coolant dispersion with phase change material includes: a redispersion unit for redispersing the coolant dispersion, the redispersion unit including a restrictor; and a recooling unit that enables freezing of a phase change material by dissipating heat stored in the coolant dispersion. The recooling unit is arranged so that dissipated heat is at least partially recuperated in order to heat up the coolant dispersion to an inlet temperature.

24 Claims, 9 Drawing Sheets

(56) References Cited

U.S. PATENT DOCUMENTS

2015/0343588 A1* 12/2015 Weiss .................... F28D 15/00
409/135

FOREIGN PATENT DOCUMENTS

| EP | 0353992 A2 * | 2/1990 | ............... C09K 5/06 |
| EP | 2949422 A1 | 12/2015 | |
| WO | WO 9833582 A1 | 8/1998 | |

* cited by examiner

REGENERATION DEVICE FOR REGENERATING A COOLANT DISPERSION

CROSS-REFERENCE TO PRIOR APPLICATION

Priority is claimed to European Patent Application No. EP 18 185 417.5, filed on Jul. 25, 2018, the entire disclosure of which is hereby incorporated by reference herein.

FIELD

The present invention relates to a regeneration device and to a method for regenerating a coolant dispersion. The present invention relates in particular to a redispersion unit for redispersing the coolant dispersion, which contains a phase change material. The present invention furthermore relates to a cooling system for cooling a machine element.

BACKGROUND

Machine tools generate inter alia a great amount of heat as a result of motor drives, which brings about an increase of the temperature of the machine elements, especially of the drive unit. The sharply rising temperature can reduce the output and machining accuracy of the machine tool and can even damage the machine elements and the drive unit. Therefore, a cooling system for cooling machine elements is used. Water, air and oil are widely used coolants.

DE 95 25 661 describes a latent heat accumulator for arranging in the coolant circuit of a motor vehicle, in which the coolant, with the internal combustion engine warm and storage medium cold, yields heat to the storage medium, and with the internal combustion engine cold and storage medium warm, absorbs heat from the storage medium. A latent heat storage element is used.

DE 3042 528 describes an electric machine with a stator, a rotor and a cooling device. The stator has a tightly sealed off cavity which is filled with a heat storage medium, which upon reaching a temperature which lies within the operating temperature range of the machine changes over from the solid into the liquid state by absorption of heat energy.

Phase change materials are known for their large heat absorption capacity during the phase transition and are increasingly being used for efficient cooling. Phase change materials are substances which at a specific temperature perform a phase transition and in the process release or absorb a large quantity of heat. In the middle of the phase transition, for example during the state change from solid to liquid, the temperature as a result of inflow or outflow of heat is barely altered. A relatively large quantity of heat can be absorbed at approximately constant temperature. This is realised by a storage material being selected which at the desired operating temperature has a phase change.

EP 2949422 describes a machine element, e.g. a motor spindle or an electromechanical drive unit, with an integrated internal cooling system. The coolant is a dispersion which contains at least one phase change material. When using the dispersion as coolant, a continuous redispersion is required. EP 2949422 describes a dynamic redispersion unit which is provided with a drive machine and with a rotor-stator. The pump of the cooling circuit is constructionally designed so that the pump effects a dispersion of the discontinuous phase of the coolant suspension. The pump is designed as a stator, with a stator ring, and a rotor, with a rotor ring, rotating therewithin. The dynamic redispersion unit, however, has the disadvantage that a motor is required.

Furthermore, the dispersion with phase change material has the characteristic that the melting temperature is higher than the solidification temperature. This effect is known as supercooling. Supercooling is basically disadvantageous. Therefore, as little as possible supercooling is desirable. In the case of supercooling, in the device for dissipating the heat of the recooling unit, not only the heat absorbed via the phase change but in addition also the sensible heat below the melting point up to the supercooling temperature has to be dissipated. This temperature lift is certainly available for the absorption of heat, but is contrary to the original aim of an isothermic cooling. The dissipation of this sensible heat would if necessary even have to be introduced again, as a result of which the method is overall energetically inefficient.

SUMMARY

In an embodiment, the present invention provides a regeneration device for regenerating a coolant dispersion with phase change material, comprising: a redispersion unit configured to redisperse the coolant dispersion, the redispersion unit comprising a restrictor; and a recooling unit configured to enable freezing of a phase change material by dissipating heat stored in the coolant dispersion, wherein the recooling unit is configured so that dissipated heat is at least partially recuperated in order to heat up the coolant dispersion to an inlet temperature.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, it is therefore an object of the invention to develop a regeneration device for regenerating a coolant dispersion which enables the freezing of the phase change material with increased level of energy efficiency.

It is also an object of the invention to specify a redispersion unit for redispersing a coolant dispersion with phase change material, which redispersion unit has a simple construction.

It is an object of the invention to propose a cooling system for cooling a machine element, which cooling system can cool the machine element to a constant temperature.

It is an object of the invention to ensure that in dependence of the cooling requirement of a machine element the inlet temperature is selected so that the latent heat is utilised to the maximum during the melting of the phase change material. This is equivalent to the aim of minimising as far as possible the difference between inlet and discharge temperature of the coolant in the machine element.

The coolant is overall to be circulated as far as possible only within the latent range during the absorption of heat. Therefore, the temperature of the coolant also has to be only just below that of the melting point during entry into the device to be cooled and, synonymous with this, the temperature during discharge from the recooling unit has to correspond to this temperature and therefore this temperature has to lie considerably above the supercooling temperature and therefore the object of the invention of a recooling unit is to dissipate the latent heat at a lower temperature than the melting temperature, even the supercooling temperature, and as far as possible to efficiently raise the temperature again to just below the melting temperature.

The present invention comprises a regeneration device for regenerating a coolant dispersion with a phase change material, a redispersion unit for redispersing the coolant dispersion, and a recooling unit. The coolant dispersion contains a phase change material. The redispersion unit has a suitable restrictor. The recooling unit enables the freezing of the phase change material by dissipating the heat stored in the coolant dispersion and is configured so that the dissipated heat is at least partially recuperated in order to heat up the coolant dispersion to an inlet temperature directly below the melting temperature.

The dispersion consists of a liquid dispersion medium and a disperse phase which can be solid or liquid. A dispersion with a solid disperse phase is referred to a suspension, a dispersion with a liquid disperse phase is referred to as an emulsion. For the present invention, the dispersion as a coolant can contain a phase change material in solid and liquid form. By using a dispersion consisting for example of water and a suitable phase change material which performs the phase transition within the range of the operating temperature of a machine element, a high heat capacity of the coolant is achieved at this operating temperature. Consequently, the waste heat of a machine element can be absorbed by the dispersion with phase change material with a small increase of the coolant temperature. Therefore, the machine element can be optimally cooled, specifically with low flow rate and low temperature difference inside the machine element which is to be cooled. The transition from the sensible to the latent heat absorption, or from the latent to the sensible heat absorption or dissipation is typically carried out not in steps but continuously. This means that for example during heating of the dispersion the specific heat capacity within the sensible range has a constant value which when the melting temperature of the phase change material is reached and so long as the latent heat absorption occurs, apparently increases, and after complete melting reduces again and assumes a lower constant value. Resulting from this shape of the characteristic curve, which resembles a normal distribution, is an operating point at which the effect of the latent heat absorption is maximum. This is subsequently referred to as the optimum operating point. In this case, the operating point is strictly speaking a very narrow temperature range, being narrowly defined in this case at a few kelvins, for example between 2 and 3 kelvins.

If the dispersion is used as coolant, the dispersion enters in such a way that the disperse phase exists in a solid state (frozen) in which almost all the phase change material particles are frozen and discharges from the device in a liquid state, in which almost all the phase change material particles are melted. The regeneration device enables the freezing of the melted phase change material by dissipating the heat stored in the coolant dispersion.

In the present invention, the freezing of the phase change material is advantageously achieved by means of a multi-stage dissipation of the heat. The recooling unit is configured so that the sensible heat is dissipated in order to cool the coolant dispersion and so that the latent heat is dissipated in order to enable the freezing of the phase change material. During the dissipation of the sensible heat, the temperature of the coolant dispersion drops up to specified temperature. During this phase, the phase change material remains in the liquid state. The freezing of the phase change material only takes place as a result of the dissipation of the latent heat.

In this case, on account of the supercooling of the phase change material (PCM) this temperature is initially reached below the melting point.

In one exemplary embodiment, the recooling unit comprises a first heat exchanger which can dissipate at least a proportion of the sensible and/or latent heat. In order to increase the energy efficiency, the first heat exchanger is operated in counterflow in order to recuperatively use at least a proportion of the sensible and/or latent heat for heating up the coolant dispersion to the inlet temperature. The inlet temperature defines the temperature of the coolant dispersion when the coolant dispersion enters the element which is to be cooled. In order to ensure an optimum level of cooling, the inlet temperature is to lie within the phase transition temperature range of the phase change material in which the phase change material changes from solid to liquid, preferably within the lower region of the phase transition temperature range. As a result, an optimum level of cooling of the machine element is achieved, because on the one hand the heat capacity within the phase transition range is very high and on the other hand the temperature variation of the coolant dispersion as a result of absorption of the heat is minimum.

In a further exemplary embodiment, the recooling unit comprises a second heat exchanger which is connected to a refrigeration system in order to enable the freezing of the phase change material by dissipation of at least a proportion of the latent heat of the coolant dispersion.

In a preferred variant, a use is made of a third heat exchanger in order to adjust the temperature of the coolant dispersion to a second target temperature before the coolant dispersion enters the redispersion unit. The second target temperature especially lies in the upper region of the phase transition temperature range, preferably in the region of between 25 and 26° C. Furthermore, the third heat exchanger is advantageously, but not absolutely necessarily, connected to the refrigeration system in order to recuperatively utilise a proportion of the heat from the refrigeration system. Consequently, the regeneration device requires no additional heat source in order to further heat the partially melted coolant dispersion, and in order to therefore be able to operate the redispersion unit and the first and second heat exchangers better. On one side, the dispersion flows through the third heat exchanger, and the refrigerant, which lies at a higher temperature than that of the coolant dispersion, flows on the other side. The coolant dispersion absorbs the heat of the medium in order to still melt all possibly still not melted PCM particles, so that in the subsequent redispersion unit a simple redispersion is possible because redispersing as an emulsion is much simpler than in a suspension.

Also, the temperature level at the third heat exchanger is increased as a result. Consequently, the dispersion enters the first heat exchanger at a higher temperature level TC02. As a result, a higher driving temperature gradient is provided at the first heat exchanger so that a compensation of possible heat losses is possible at the first heat exchanger and the inlet temperature TI04 can always be high enough for it to lie as close as possible to the melting point.

In one exemplary embodiment, the third heat exchanger is arranged upstream of the redispersion unit and the first and the second heat exchangers are arranged downstream of the redispersion unit. A mixing unit is arranged between the third heat exchanger and the redispersion unit.

In one exemplary embodiment, the regeneration unit comprises a control unit which has at least one temperature monitor and at least one flow rate monitor. This control unit can follow the aim of keeping the inlet temperature constant.

In one exemplary embodiment, use is made of a model-based predictive control system (MPC) which determines the inlet temperature in dependence of the heat to be dissipated in the machine element. The inlet temperature is selected in this case so that the heat absorption is carried out in the region of the optimum operating point of the coolant dispersion in order to utilise the maximum apparent heat capacity.

In a further exemplary embodiment, use is made of a model-based predictive control system (MPC) which keeps the inlet temperature constant but ensures that the available latent heat capacity is altered by partial melting of the phase change material so that it corresponds to the heat to be dissipated in the machine element. This has the advantage that ideally the flow rate, the inlet temperature and the discharge temperature from the machine element to be cooled are constant.

In one exemplary embodiment, the controlling of the temperature takes place at the point between the first heat exchanger and the second heat exchanger (TI03 in FIG. 5) by modulation of the evaporating pressure in the refrigerating machine, for example by means of a bypass control device. As a result, it can be ensured that on the one hand a sufficiently low temperature (TI05 in FIG. 5) of the coolant is ensured, but on the other hand a precisely adapted heat dissipation exists in the second heat exchanger. Therefore, the latent heat quantity is dissipated exactly at the level of the supercooling, but the temperature is not unnecessarily lowered. An excessive lowering of the temperature would in particular lead to the possibility of reheating being insufficient at the first heat exchanger, that is to say the inlet temperature (TO04 in FIG. 5) remains too low.

Possible instabilities and fluctuations are inventively resolved by means of an embodiment with a third heat exchanger.

Required for the controlling are at least two control circuits which are advantageously coupled. The first control circuit is required for a controlling of TI03 via the pressure in the refrigerating machine process and indirectly therefore via the starting temperature TI05. In this case, two aspects are to be observed at the same time. Firstly, the correct inlet temperature has to exist. This is a function of the supercooling of the coolant dispersion and is to be determined experimentally in advance. Secondly, the correct heat quantity has to be established. This can be carried out by checking the temperature T06.

The second control system is required for ensuring an inlet temperature TO4 which is as accurately suitable as possible for entry into the machine element to be cooled. This is carried out both by means of the first control circuit and with the aid of the three-way valve in the refrigerating circuit and on the third heat exchanger.

In the present invention, use is made of a phase change material as a disperse phase which has a solid-liquid phase change within a phase transition temperature range of between 18 and 28° C., preferably within a phase transition temperature range of between 21 and 25° C. The dispersion medium consists of a fluid with low viscosity, preferably between 0.5 and 1000 mPas, for example oil, glycol or an aqueous formulation. The disperse phase consists of an organic, nonpolar medium, preferably a paraffin, a fatty acid or a fatty acid ester, for example paraffin with the summation formula $C_nH_{2n+2}$. In addition, the dispersion as coolant contains an emulsifying system consisting of surface-active substances. The emulsifying system effects the stabilisation of the dispersion and contains for example a mixture of at least two of the following substances: sorbitan stearate, sorbitan monooleate, glycol monostearate and partially toxicated alcohol.

In one embodiment variant, the disperse phase has a diameter of 5 μm maximum, preferably less than 1 μm, so that the stability of the coolant dispersion against creaming is provided.

In one variant, so-called nucleation formers are added to the coolant dispersion, which nucleation formers minimise the effect of supercooling, for example from 15 kelvin temperature difference between melting point and freezing point to then 5 kelvin.

In one variant, the proportion of the disperse phase in the coolant dispersion is at least 10%, preferably between 15 and 25%. The phase change enthalpy of the dispersion is between 30 kJ/kg and 60 kJ/kg.

In one advantageous variant, the dispersion contains an emulsifying system which is designed to that with a shear rate of at most 50000 l/s a stable emulsion ensues. For the stabilisation, the dispersion contains an emulsifying system which contains surface-active substances. For example, an emulsifying system with an HLB value (hydrophilic-lipophilic balance) of between 8 and 15. The emulsifying system is selected so that a stable emulsion with low shear rates already ensues.

The regeneration device advantageously has in addition a recooling unit, a mixing unit, a pump and a filter. As a mixing unit, use is made in one variant of a recycle reactor in order to achieve a homogeneous distribution of the dispersion. In another variant, a simple mixer is used.

For stabilising the coolant dispersion with a phase change material, a continuous redispersion is advantageous. In the present invention, a static redispersion unit with a restrictor is used. A static redispersion unit is significantly more simple to implement than a dynamic unit with a motor. The redispersion unit is designed in such a way that sufficient shear forces are created so that a redispersion of the emulsion takes place. The level of the necessary shear forces depends on the general stability of the emulsion and especially of the emulsifying system. At the same time, the redispersion unit must not have excessively high pressure losses since these are eventually to be applied by a feed pump.

The restrictor has a body with at least one orifice. In a preferred variant, the restrictor has as multiplicity of orifices in order to achieve an optimum redispersion of the coolant dispersion. A narrowing of the flow leads to an increase of the flow velocity and as a result of constriction of the flow when flowing through the restrictor orifices leads to a shearing and to a turbulent flow. As a result, the coolant dispersion is dispersed. In comparison to a dynamic solution, this variant has the advantage of an inexpensive construction. Furthermore, the restrictor can be installed and removed in a simple manner.

In one exemplary embodiment, the restrictor orifice has a diameter of between 0.5 and 2.5 mm, preferably 0.7 mm, 1 mm and 1.5 mm. The selection of the diameter is dependent on the composition of the coolant dispersion and on the operating temperature of the machine element to be cooled.

In one variant, the restrictor orifices are arranged in the restrictor body in an equally distributed manner in relation to each other. The restrictor has a very small diameter. This would not be possible according to the prior art since with this the pressure loss would be very large and the pump capacity would be high and therefore heating of the product would take place. This was therefore previously costly with regard to equipment and energetically unfavourable. For this purpose, a very large number of restrictor orifices are added in a restrictor body in an equally distributed continuous manner. In this way, the high pressure loss can be avoided. In spite of that, sufficiently high shear rates are achieved.

In one preferred variant, the redispersion unit is to be arranged downstream of the passage of flow through the machine element to be cooled. After the passage of flow through a machine element to be cooled, the phase change material in the coolant dispersion is melted, and the dispersion with the phase change material exists as an emulsion and can therefore be easily redispersed.

In trials, it was established that with the new restrictor as the redispersion unit very fine-particle dispersions can be produced, or redispersed. Coarse emulsions were circulated via the restrictor and the particle size distributions were measured. Measurements with 3 different restrictor diameters and different number of restrictor orifices in each case were carried out. For example, one restrictor had one orifice with a diameter of 2.5 mm, one restrictor had 21 orifices with a diameter of 1 mm, and one restrictor had 61 orifices with a diameter of 0.5 mm. With all the restrictors, a fixed final value of the particle size distribution was able to be achieved, which is very satisfactory. The calculated shear rates remain below 20000 l/s and therefore substantially less than conventional rotor-stator geometries produce.

In the present invention, a cooling system for cooling a machine element comprises a coolant dispersion and a regeneration device.

The machine tool according to the invention consists of one or more machine element(s) to be cooled, especially a motor spindle and/or an electromechanical drive unit and a cooling system.

The invention is based on a method for regenerating a coolant dispersion with phase change material. The method features the following steps: redispersing the coolant dispersion by means of a redispersion unit which features a restrictor; enabling the freezing of the phase change material by dissipating the heat stored in the coolant dispersion by means of a recooling unit, wherein the recooling unit is configured so that the dissipated heat is at least partially recuperated in order to heat up the coolant dispersion to an inlet temperature.

Figure 1:
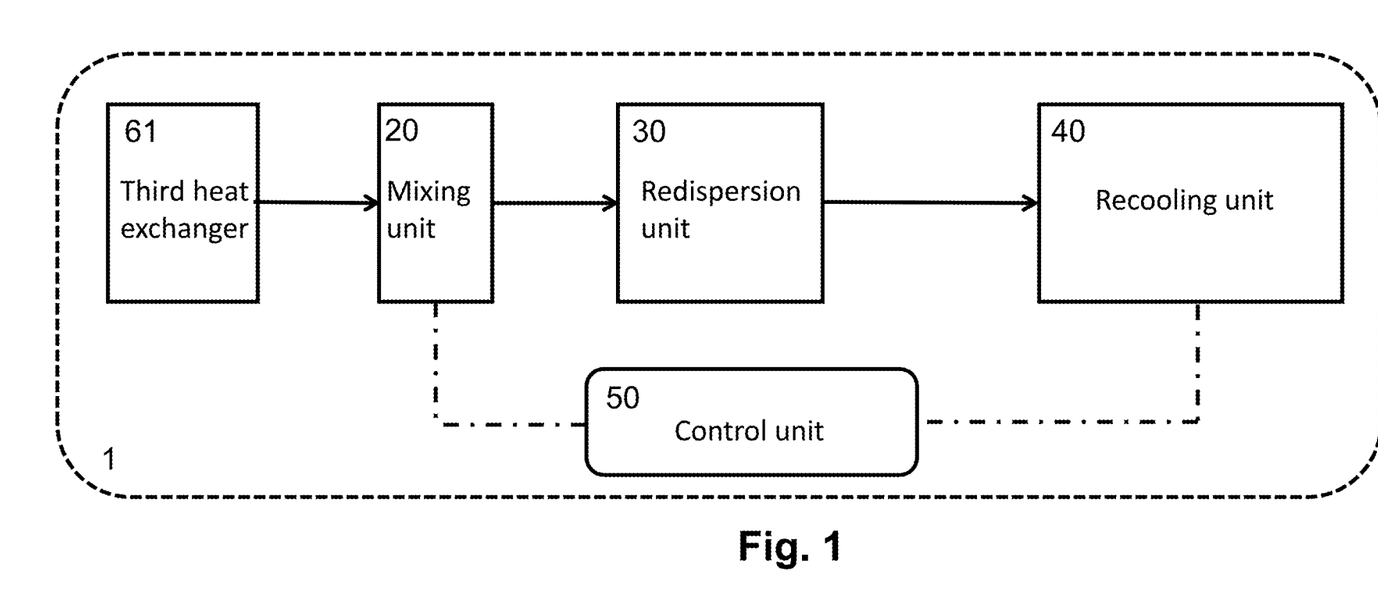
FIG. 1 shows a schematic representation of the cooling system.
Figure 9:
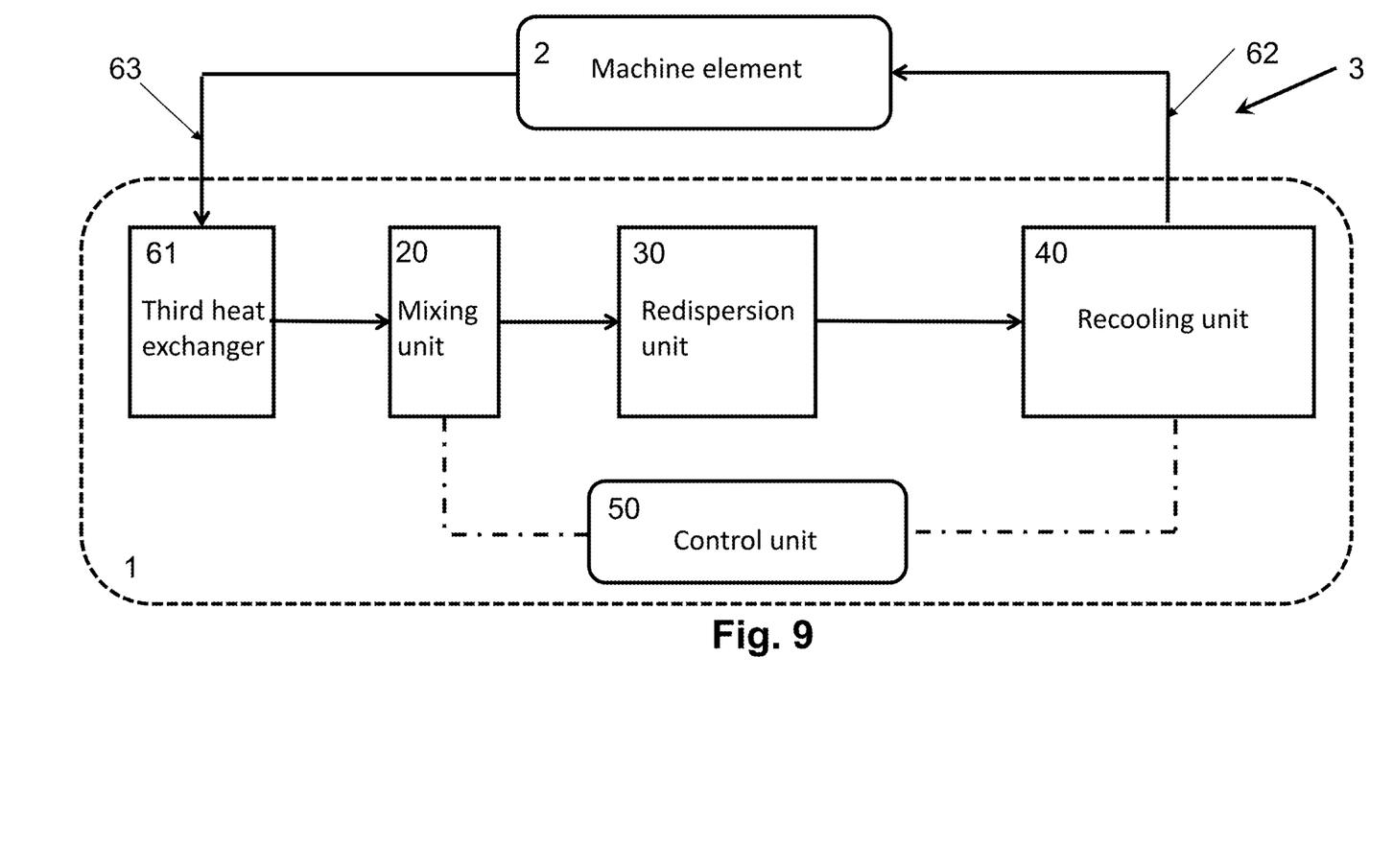
FIG. 9 shows a cooling system for cooling a machine element.

FIG. 1 shows a schematic representation of the regeneration device 1 for regenerating a coolant dispersion with a phase change material. The regeneration device consists of a third heat exchanger 61, a mixing unit 20, a redispersion unit 30, a recooling unit 40 and control unit 50. The coolant dispersion as coolant flows at an inlet temperature and in a first phase into a machine element to be cooled, absorbs the heat of the machine element and flows at a discharge temperature and in a second phase out of the machine element. In the first phase, the phase change material is solid, whereas in the second phase the phase change material exists in the form of liquid. The recooling unit 40 is configured so as to dissipate the absorbed heat and to enable a phase change of the coolant dispersion from the second phase to the first phase. Furthermore, the coolant dispersion is adjusted to an inlet temperature which lies at the bottom end of the phase change material temperature range. As shown in FIG. 9, the heated coolant dispersion flows through the inlet 62 into the machine element 2 and flows out of the machine element through the outlet 63.

The control unit 50 comprises a multiplicity of temperature and flow rate monitors in order to monitor and/or to control the temperature or the flow rate of the coolant dispersion in the cooling system at different positions.

Figure 2:
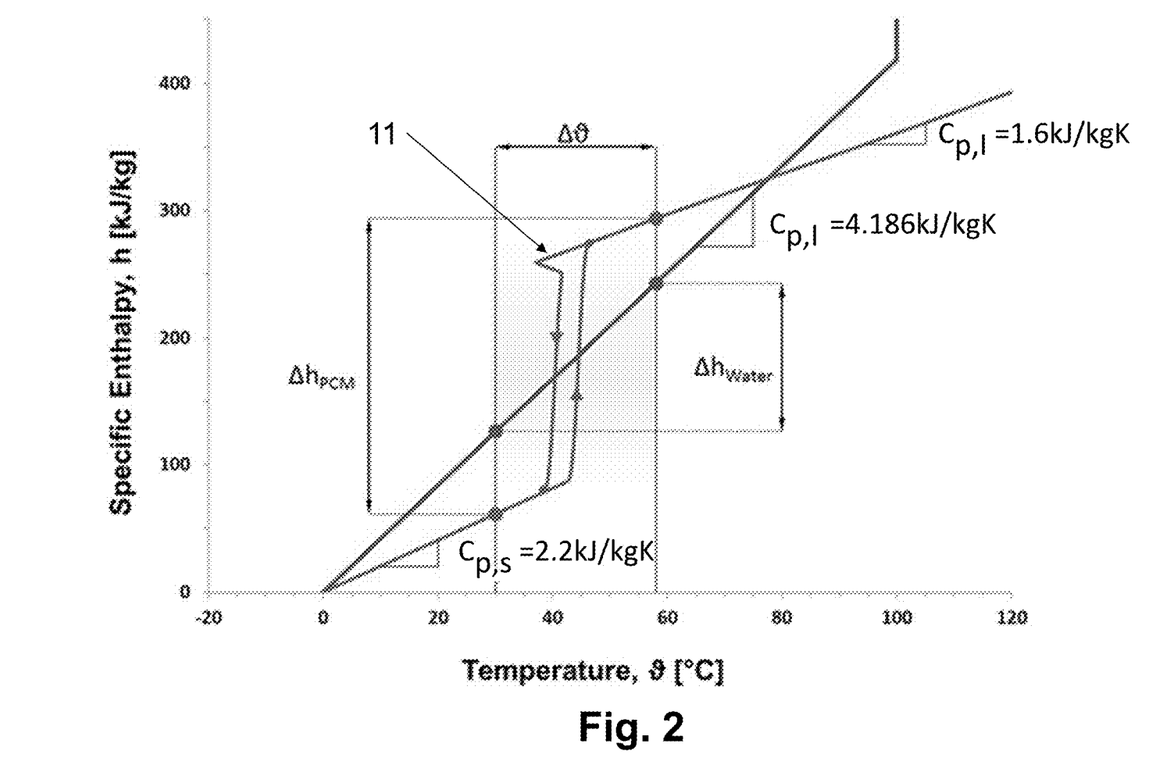
FIG. 2 shows comparison of the heat capacity of water and phase change material.

The dispersion with phase change material has the characteristic that the melting temperature is higher than the solidification temperature. FIG. 2 shows a comparison of the absorption of heat by phase change material with water. The phase change material shown here has a phase change at approximately 40° C. For a comparative temperature difference, a phase change material absorbs substantially more heat and correspondingly less temperature difference is apparent in the phase change range with the same heat quantity. In a theoretical border-line case, this is isothermic. During the cooling, as the curve from top right to bottom left shows, the supercooling 11 is identified at the pointed projection which extends further to the left than would correspond to the normal hysteresis.

Figure 3:
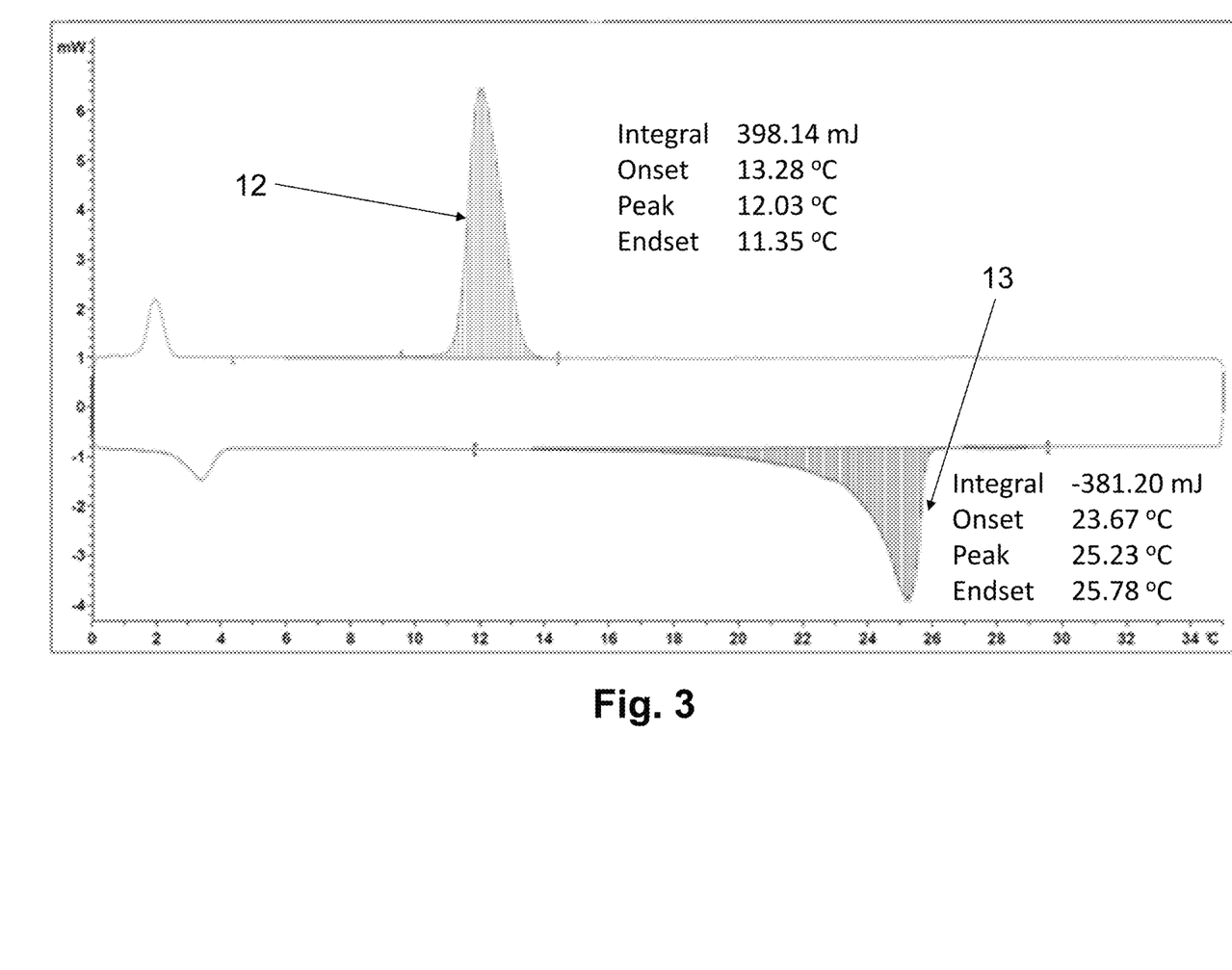
FIG. 3 shows measurement results of the enthalpy of phase change material.

FIG. 3 shows a measurement of the enthalpy over the temperature. The process of dynamic differential calorimetry can be used for the purpose of detecting the dissipated or absorbed heat quantity of a sample.

In one embodiment, the dispersion has a disperse phase proportion, specifically the proportion of the phase change material, of approximately 20%. In the case of this dispersion with paraffin as phase change material and an ethoxylated fatty alcohol as emulsifier, the phase change enthalpy is approximately 30 kJ/kg. Shown in FIG. 3 are the absorbed heat 13 and the dissipated heat 12. By an optimum selection of the dispersion medium and the phase change material, the phase change enthalpy can be increased. In one preferred variant, a coolant dispersion with a proportion of disperse phase of 30% is used. In this case, the phase change enthalpy can lie within the range of between 60 kJ/kg and 80 kJ/kg.

Figure 4:
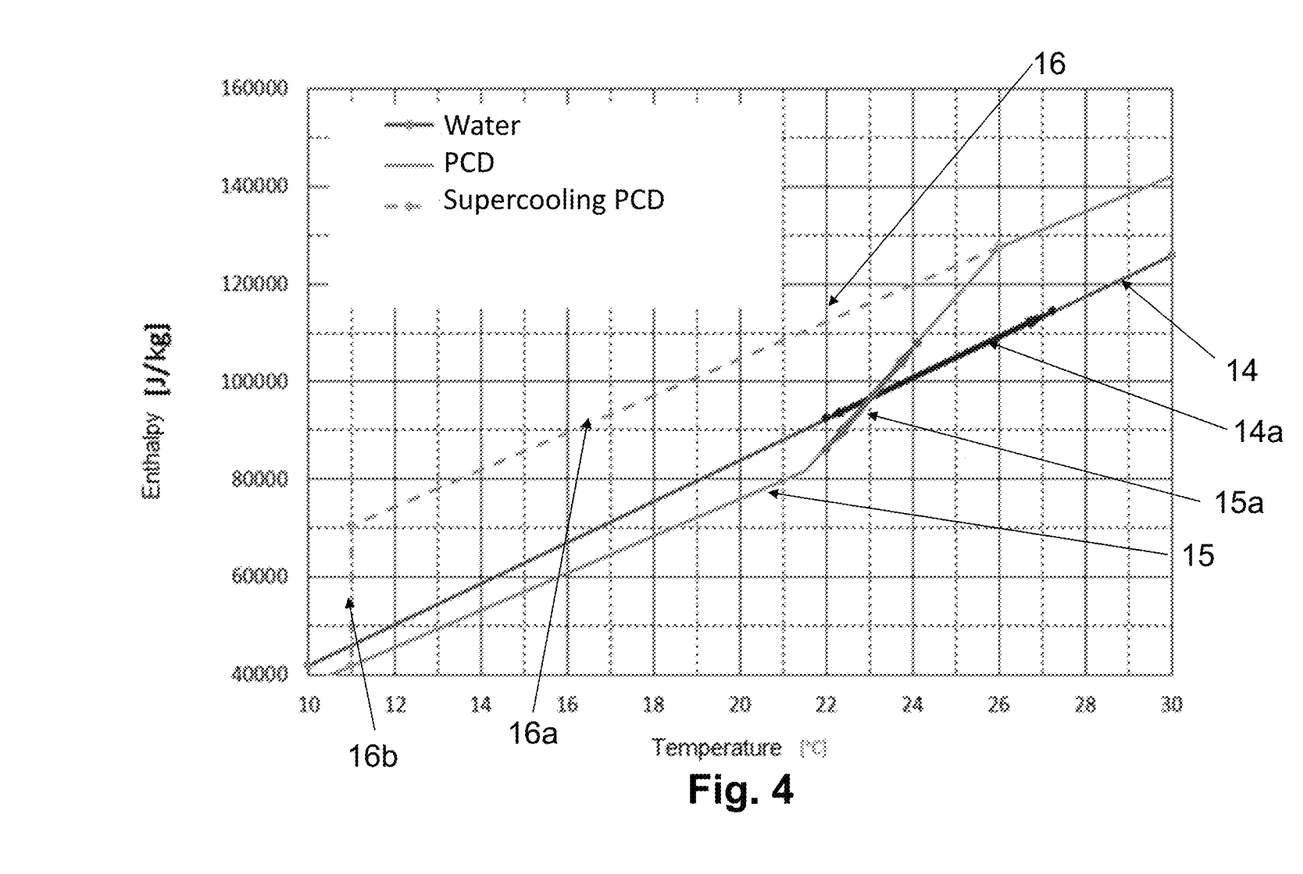
FIG. 4 shows a characteristic curve of the enthalpy.

Shown in FIG. 4 is the enthalpy characteristic curve in relation to the temperature when cooling of the machine element is being used. Shown as a comparison are the calculated characteristic curves for water and a dispersion with phase change material.

In one embodiment, the machine element to be cooled is a spindle. In order to ensure sufficient cooling, a thermal capacity of for example 1400 watts (or J/s) or more have to be transported away from the spindle. The operating temperature of the spindle lies within the range of between 24 and 25° C.

The continuous line 14 shows the characteristic curve of the enthalpy when water is used as the coolant. During the heating up, the enthalpy increases within the depicted range with an almost constant slope which represents the specific heat quantity over the temperature, for example with an approximately constant heat capacity of 4200 J/kg in simple terms.

The continuous line 15 shows the characteristic curve of the enthalpy when a dispersion with a phase change material is used as the coolant, if with 20% proportion of the disperse phase paraffin is used as phase change material and ethoxylated fatty alcohol is used as emulsifier.

Until reaching the phase change at approximately 21.5° C. (cf. FIG. 3), the increase is approximately 3800 J/kg. This lies at the proportion of organic phase of 20% with slightly lower specific heat capacity than water. At 21.5° C., the phase change commences. This ends at approximately 26° C.

With a dissipated heat quantity of 2200 watts and a coolant flow of 6 l/min, the specific heat quantity of 22000 J/kg has to be absorbed from the coolant flow. In the case of cooling with water, a temperature difference of 5.3 K, inlet temperature of for example 22° C. and discharge temperature of 27.3° C. ensues, as marked in FIG. 4 by a thick double arrow 14a. In the case of cooling with dispersion with phase change material, the temperature increase is only 2.1 K. It is important for the operation that the operation of the coolant in the case of the dispersion with phase change material is carried out within the latent range in order to achieve an efficient level of cooling and in order to minimise the difference between the inlet temperature and the discharge temperature of the coolant.

During cooling down, the enthalpy characteristic curve of the dispersion with phase change material does not follow the heating up curve 15 but a cooling down curve 16. The state of the melted disperse phase is maintained past the melting point. This effect of supercooling is shown in an idealised manner by the cooling down curve 16. The effect can also be recognised in the dispersion with phase change material. The supercooling is disadvantageous and unavoidable. Therefore, the actual phase change enthalpy is only dissipated at approximately 11° C. As a consequence, a recooling unit has to be operated at lower temperatures than the actual phase change temperature. Without further measures, this leads to a lower level of efficiency of the refrigerating machine and to a very high cooling capacity demand and even to the necessity of reheating.

The first part 16a of the cooling down curve with a slope represents the dissipation of the sensible heat, and the second part 16b of the cooling down curve represents the dissipation of the latent heat, specifically the phase change enthalpy at approximately 11° C. After the dissipation of the sensible heat, the phase change material is still in the second phase, that is to say melted. By dissipating the latent heat, the phase change material is brought from the second phase to the first phase and the phase change material is in the solid state.

As shown in FIG. 4, the dispersion with the phase change material in a solid state has to be adjusted to an inlet temperature which for example lies at the bottom end of the phase transition temperature range so that the machine element is cooled at a temperature which is as constant as possible.

Figure 5:
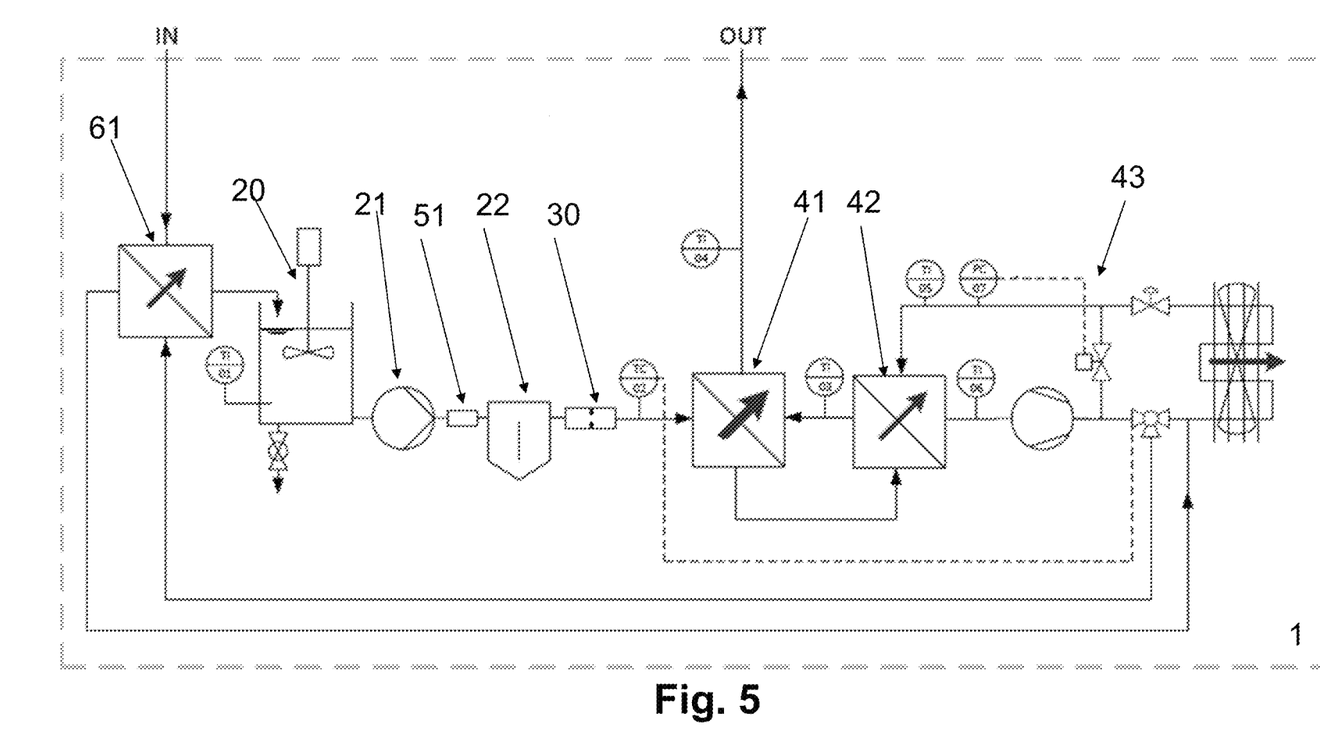
FIG. 5 shows an embodiment of the regeneration device.

FIG. 5 shows a detailed schematic representation of an embodiment of the regeneration device which effects an improved level of efficiency. For better understanding of the process using the coolant dispersion with phase change material, reference is made in the following text to temperature measuring points, and numerical examples of temperatures are listed, which serve for better understanding. These, however, are not to be understood as being accurate and/or as being preferred.

TC and PC symbolise a controlled temperature and a controlled pressure and TI represents the indicated temperature. The target temperature of TC2 is 25° C. and is adjustable within the range of between 23 and 27° C. The condensation pressure PC07 is selected so that the condensation temperature is 8° C. and is adjustable within the range of between 6 and 10° C. The temperature of the coolant dispersion in the mixing unit TI01 is adjusted via TC02 and lies within the range of between 23 and 27° C. The temperature of the coolant dispersion downstream of the outlet from the second heat exchanger 42 TI03 is adjusted via PC07 and lies with the range of between 9 and 11° C. The temperature of the coolant dispersion at the outlet of the regeneration device TI04 is adjusted via TC02 and lies with the range of 22 and 23° C. The temperature of a refrigerant before entry into the second heat exchanger TI05 is adjusted via PC07 and lies with the range of between 6 and 10° C. In order to avoid overheating of the refrigerant, the temperature difference between TI05 and TI06 is to be less than 2 K.

When the coolant dispersion flows out of the machine element to be cooled, the temperature of the coolant dispersion lies with the range of between 24 and 25° C. If the discharge temperature of the coolant dispersion from the machine element is 24° C., then it is not completely melted. This for example can occur at partial load. In this case, the coolant dispersion is heated up further in a third heat exchanger 61 before entry into the redispersion unit. This is realised by the use of a heated refrigerant in refrigeration system 43, as is explained in more detail below. In one variant, the coolant dispersion is heated to a temperature which lies at the end of the phase transition temperature range, for example up to 26°. This process leads to the coolant dispersion with phase change material being completely melted and ideal conditions existing for the passage of flow through the subsequent element. Large solid proportions in the dispersion, for example frozen agglomerates, could otherwise block the filter 22 and the redispersion unit 30. The melted phase change material can ensure an optimum dispersion through the redispersion unit. Furthermore, a second heat exchanger 42 can be operated in a better way since a sufficiently high temperature T02 is required for efficient operation of the second heat exchanger 42. This is necessary in order to enable a sufficiently high temperature in the dispersion at the point TI04. Consequently, a sufficiently large temperature difference exists at the second heat exchanger 42 so that the state of the dispersion at the point T04 is such that the latent range starts directly. This for example is 22° C. Without the heating up process by means of the third heat exchanger 61, the temperature of the coolant dispersion at the point TI04 lies at 20° C., which is lower than the temperature at which the latent range begins. The machine element could also certainly be cooled at a temperature of 20° C. at TI04. However, the value of the temperature increase inside the machine element increases by a further 2 kelvin (22° C. -20° C.), which reduces the temperature constancy and in effect reduces the precision of the machine.

The coolant dispersion which is heated up by the third heat exchanger 61 flows through a mixing unit 20, a filter 22 and a restrictor 31, which serves as a redispersion unit. A pump 21 is arranged between the mixing unit and the filter in order to ensure the throughflow of the coolant dispersion. A multiplicity of temperature monitors and flow rate monitors are used in order to monitor temperatures and flow rate in the cooling system and in order to enable the control circuits. A flow rate monitor 51 is positioned upstream of the filter in order to monitor and to measure the flow rate of the coolant dispersion.

The restrictor is advantageously arranged downstream of the passage of flow through the machine element to be cooled. After flow has passed through the machine element to be cooled, the phase change material in the coolant dispersion is molten. The coolant dispersion with the phase change material exists as emulsion and can be easily dispersed.

In the first heat exchanger 41, the entire enthalpy of the coolant dispersion is dissipated until the dispersion reaches a temperature of 11° C. The phase change has still not taken place. It is apparent in FIG. 4 that the heat quantity transferred in the sensible range is much greater than that of the actual phase change in the latent range.

In the second heat exchanger 42, at about 11° C. (on the side of the dispersion), the phase change is completed by dissipation of the melting enthalpy. The coolant dispersion with the phase change material now exists in the solidified state at 11° C. This temperature at the point TI03 can be determined by means of a temperature monitor. The cold coolant dispersion from the second heat exchanger 42 flows back through the first heat exchanger 41 is brought there to the desired inlet temperature of 22° C. at the point T04. The temperature change from 11° C. at the point TI03 to 22° C. at the point T04 is slightly less than the difference away from there, specifically 24° C. at the point T02 until entry into the second heat exchanger 42 at 11° C. Therefore, no heat losses can be compensated. The flow conducting in the first heat exchanger 41 is preferably in counterflow. Therefore, the inlet temperature at the point T04 advantageously lies within the latent range, for example at 22° C.

TC02 advantageously lies so that the temperature of the coolant dispersion is sufficiently high for an emulsion to exist. This controlling is indicated in FIG. 5 by a dashed line. The hot gas temperature downstream of the coolant compressor lies at a temperature level greater than ambient temperature in order to release the heat to the environment by means of an air cooler. The hot gas temperature is advantageously >30° C., especially advantageously 40° C.

In addition, a sufficiently low temperature TI03 (e.g. 11° C.) is ensured by a lower lying temperature of the refrigerant (TI05) of for example 8° C. The controlling of TI05 in the refrigerant circuit is advantageously achieved by means of a bypass control, in this case the bypass pressure PC07 is controlled. The required pressure can be selected in accordance with the refrigerant used. The second heat exchanger 42, which is operated in counterflow, enables supercooling with a reduced refrigeration requirement and higher energy efficiency.

Figure 6:
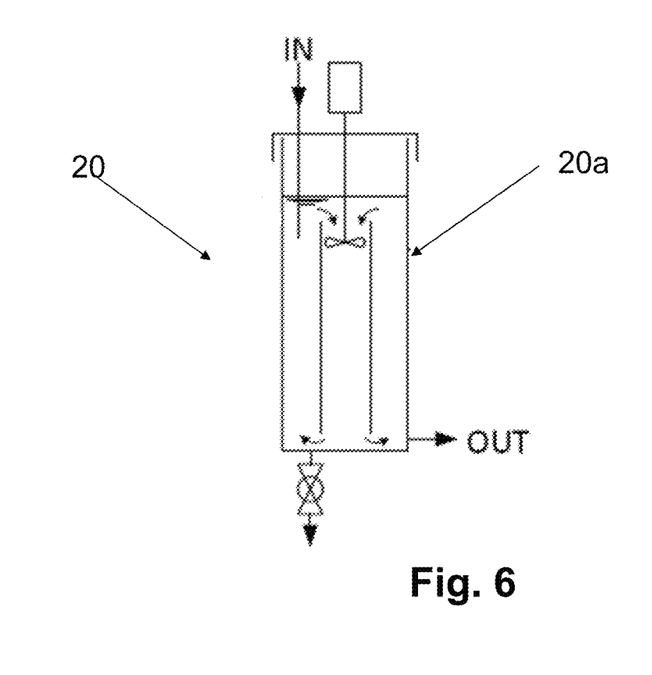
FIG. 6 shows a mixing unit.

FIG. 6 shows a schematic representation of the mixing unit 20. The coolant dispersion flows from the top into the mixing unit. A pipe 20a for flow conducting is arranged in the mixing unit. As a result, a good homogeneous mixing-through is to be ensured. The pipe which is used can include transverse grooves at the bottom and therefore be positioned on the container base, as a result of which the coolant dispersion can flow out through the transverse grooves and can circulate as indicated. The mixed-through coolant dispersion can flow out from an opening which is arranged on the lower part of the mixing unit.

Figure 7:
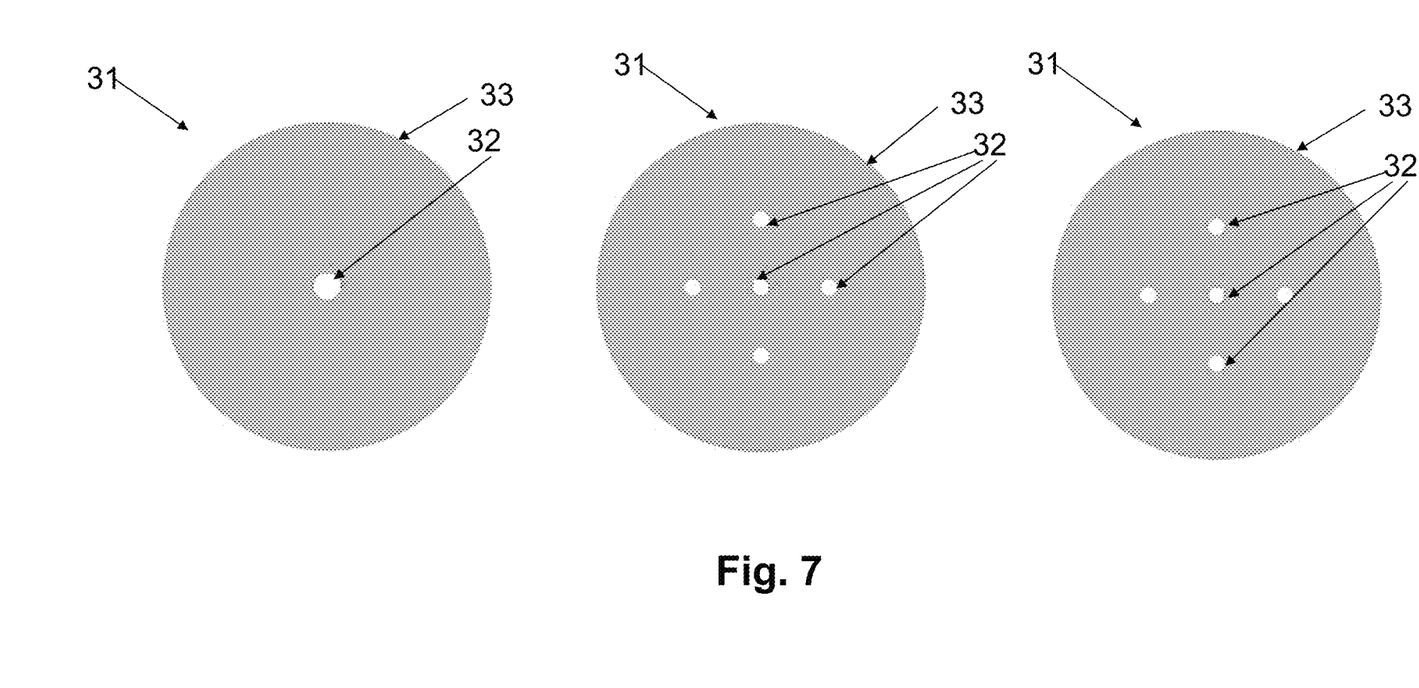
FIG. 7 shows first, second and third embodiments of the redispersion unit.
Figure 8:
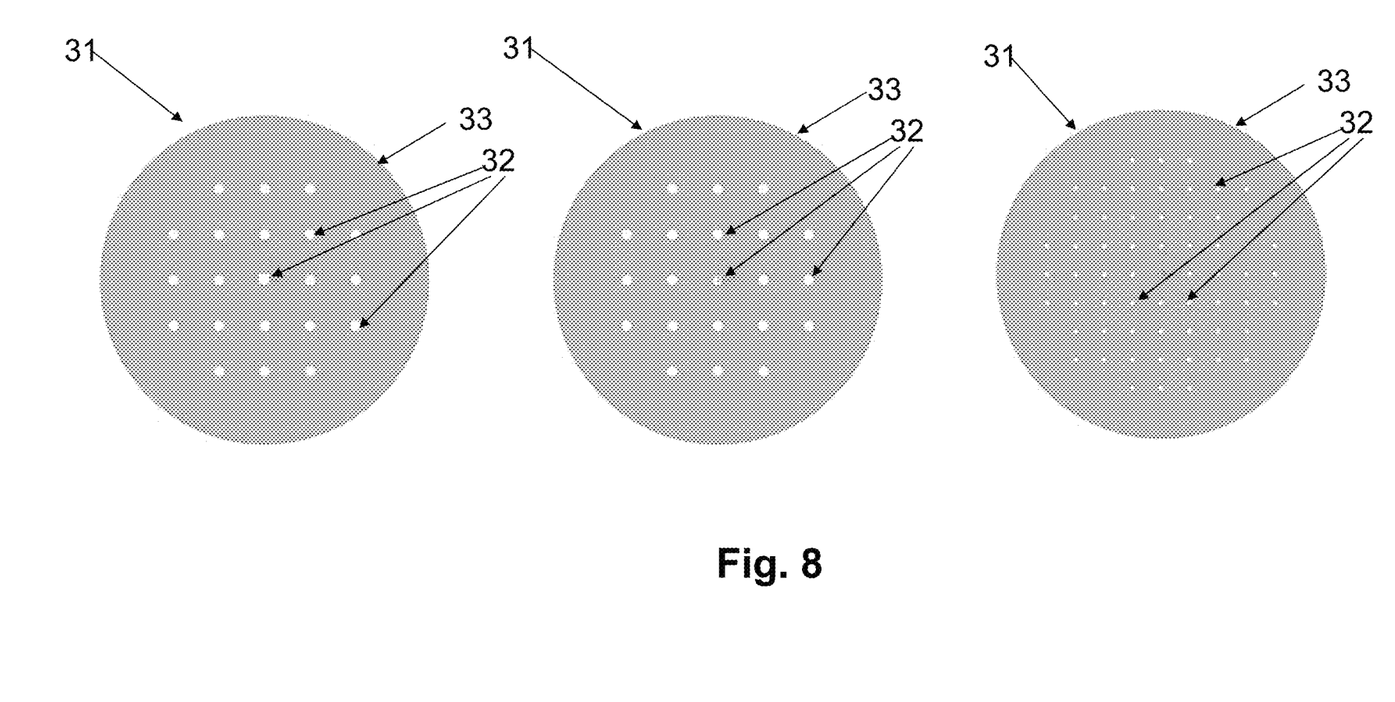
FIG. 8 shows fourth, fifth and sixth embodiments of the redispersion unit.

FIG. 7 and FIG. 8 show six embodiments of the restrictor 31. All embodiments have a round restrictor body 33. The restrictor orifices 32 are introduced in a continuous manner in the restrictor body. The number of restrictor orifices is different in different embodiments. One embodiment has one restrictor orifice. The number of restrictor orifices of other embodiments is 5, 9, 21, 29 and 61 in order to adjust the pressure drop with a predetermined flow rate. The diameters of the restrictor orifices can vary, for example 2.5 mm, 1.5 mm, 1 mm, 0.7 mm and 0.5 mm.

The orifices in the restrictors are advantageously circular but can have any geometries.

FIG. 9 shows a cooling system 3 for cooling a machine element by means of a coolant dispersion. A regeneration device 1 is used in order to regenerate the coolant dispersion.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF DESIGNATIONS

1 Regeneration device
2 Machine element
3 Cooling system
10 Dispersion
11 Supercooling
12 Dissipated heat
13 Absorbed heat
14 Characteristic curve of the enthalpy (water)
15 Characteristic curve of the enthalpy (dispersion with phase change material)
16 Cooling down curve (dispersion with phase change material)
20 Mixing unit
20a Pipe
21 Pump
22 Filter
30 Redispersion unit
31 Restrictor
32 Restrictor orifice
33 Restrictor body
40 Recooling unit
41 First heat exchanger
42 Second heat exchanger
43 Refrigeration system
50 Control unit
51 Flow rate monitor
61 Third heat exchanger
62 Outlet
63 Inlet

What is claimed is:

1. A regeneration device for regenerating a coolant dispersion with phase change material, comprising:
   a redispersion unit configured to redisperse the coolant dispersion as an emulsion comprising a liquid dispersion medium and a disperse phase, wherein the disperse phase comprises the phase change material, and the redispersion unit comprises a restrictor; and
   a recooler configured to enable freezing of the phase change material by dissipating heat stored in the coolant dispersion,
   wherein the recooler is configured so that dissipated heat is at least partially recuperated in order to heat up the coolant dispersion to an inlet temperature.

2. The regeneration device according to claim 1, wherein the regeneration device comprises a control unit which has at least one temperature monitor and at least one flow rate monitor.

3. The regeneration device according to claim 2, further comprising a model-based predictive controller.

4. The regeneration device according to claim 3, wherein the inlet temperature is controlled in dependence of a cooling requirement so as to optimize heat absorption in a machine element.

5. The regeneration device according to claim 3, wherein a proportion of melted phase change material is controlled so that an available latent heat capacity corresponds to a cooling requirement in a machine element.

6. A cooling system for cooling a machine element, comprising:
   a coolant dispersion with a phase change material; and
   the regeneration device according to claim 1.

7. A machine tool, comprising:
   at least one machine element, the at least one machine element comprising a motor spindle or an electromechanical drive unit; and
   the cooling system according to claim 6.

8. A method for regenerating a coolant dispersion with a phase change material, comprising:
   redispersing the coolant dispersion by a redispersion unit which has a restrictor, wherein the redispersion unit is configured to redisperse the coolant dispersion as an emulsion comprising a liquid dispersion medium and a disperse phase, and wherein the disperse phase comprises the phase change material; and
   enabling a freezing of the phase change material by dissipating heat stored in the coolant dispersion by a recooler, the recooler being configured so that the dissipated heat is at least partially recuperated in order to heat up the coolant dispersion to an inlet temperature.

9. The regeneration device according to claim 1, wherein the inlet temperature lies within a phase transition temperature range of the phase change material during which the phase change material changes from a solid to a liquid state.

10. The regeneration device according to claim 9, wherein the inlet temperature lies within a lower region of the phase transition temperature range.

11. The regeneration device according to claim 1, wherein the recooler is configured so that sensible heat is dissipated in order to cool the coolant dispersion and latent heat is dissipated in order to enable freezing of the phase change material.

12. The regeneration device according to claim 11, wherein the recooler comprises a first heat exchanger configured to dissipate at least a proportion of the sensible and/or latent heat.

13. The regeneration device according to claim 12, wherein the first heat exchanger is operated in counterflow in order to recuperatively use at least a proportion of the sensible and/or latent heat for heating up the coolant dispersion to the inlet temperature.

14. The regeneration device according to claim 12, wherein the recooler includes a second heat exchanger which is connected to a refrigeration system in order to enable freezing of the phase change material by dissipating at least some of the latent heat of the coolant dispersion.

15. The regeneration device according to claim 14, further comprising a third heat exchanger configured to adjust a temperature of the coolant dispersion to a second target temperature before the coolant dispersion enters the redispersion unit.

16. The regeneration device according to claim 15, wherein the third heat exchanger is connected to the refrigeration system in order to recuperatively use some heat from the refrigeration system.

17. The regeneration device according to claim 15, wherein the third heat exchanger is arranged upstream of the redispersion unit and the first and second heat exchangers are arranged downstream of the redispersion unit.

18. The regeneration device according to claim 15, further comprising a mixer arranged between the third heat exchanger and the redispersion unit.

19. The regeneration device according claim 15, wherein the second target temperature lies in an upper region of a phase transition temperature range of the phase change material.

20. The regeneration device according claim 19, wherein the second target temperature lies in a region of between 25 and 26° C.

21. The regeneration device according to claim 1, wherein the restrictor comprises a disc-like body and at least one orifice.

22. The regeneration device according to claim 21, wherein the at least one orifice has a diameter within the range of between 0.5 and 2.5 mm.

23. The regeneration device according to claim 21, wherein the at least one orifice comprises a multiplicity of orifices.

24. The regeneration device according to claim 23, wherein the multiplicity of orifices are arranged in the disc-like body in a continuous equally distributed manner in relation to each other.

* * * * *